July 17, 1962 F. J. L. TURNER ETAL 3,044,675
TAPE FEED APPARATUS
Filed Nov. 5, 1959
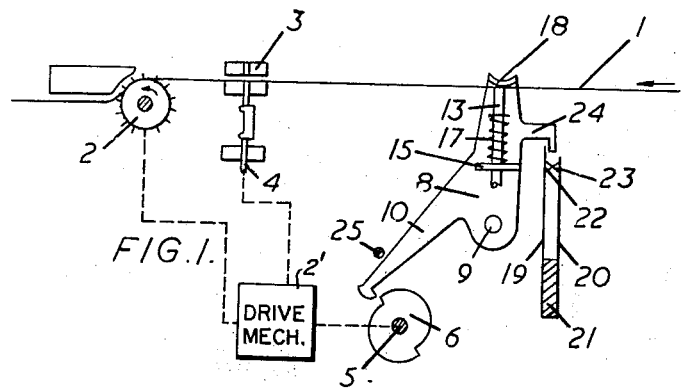
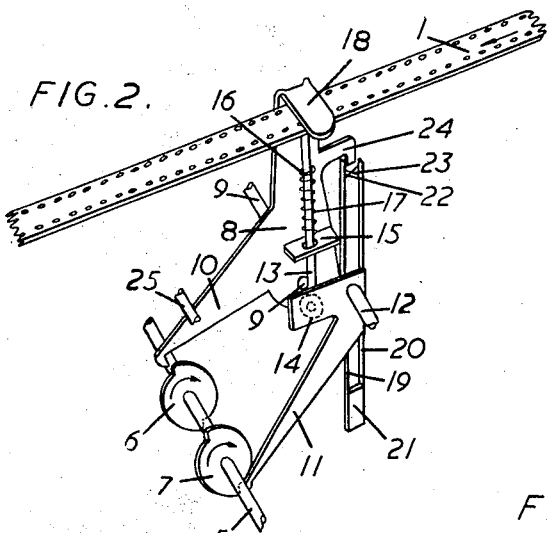
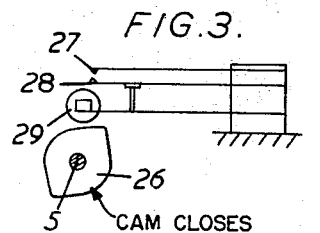
CAM CLOSES CONTACTS 27 & 28 DURING PERIOD WHEN CONTACTS 22 & 23 ARE NORMALLY OPEN
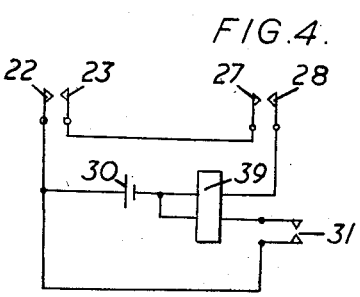
*Inventor*
F.J.L. TURNER -
B.S. MOORE
By Paul W. Henninger
Agent

United States Patent Office 3,044,675
Patented July 17, 1962

3,044,675
TAPE FEED APPARATUS
Frederick James Leslie Turner and Brian Stanley Mason, Croydon, England, assignors to Creed & Company Limited, Croydon, England, a company of Great Britain
Filed Nov. 5, 1959, Ser. No. 851,135
6 Claims. (Cl. 226—11)

This invention relates to tape feed apparatus and more particularly to tape feed apparatus including means for indicating tape feed failure.

Tape feed failure can occur for several reasons, such as torn sprocket feed holes in the tape, breakage of the tape, exhaustion of the tape supply or mechanical breakdown of the tape feed apparatus.

Devices have been proposed for indicating tape feed failure, but such proposed devices have been found to be unsuitable for use in apparatus in which tape is to be fed at high speed, such as the speed of the tape in teleprinter perforator apparatus operating at a speed of 25 characters per second.

It is an object of the present invention to provide means for indicating tape feed failure in, for example, a high speed tape feed apparatus.

According to the present invention there is provided a tape feed apparatus comprising means for feeding a tape, a clamp arrangement for being clamped to the tape and for being moved by the tape when the latter is being fed, means for releasing the clamp arrangement after movement by the tape and for returning the clamp arrangement to the original position to re-clamp the tape, and means controlled by movement of the clamp arrangement for indicating tape feed failure.

One embodiment of the invention will now be described with reference to the accompanying drawing, in which:

FIG. 1 is a side elevation of part of the tape feed apparatus;

FIG. 2 is a perspective view of part of the tape feed apparatus;

FIG. 3 is a side elevation of another part of the apparatus; and

FIG. 4 is a diagrammatic view of an indicating or alarm circuit.

FIGS. 1 and 2 show a tape 1 being fed through a high speed teleprinter perforator, but it is to be noted that the tape feed apparatus, according to the invention, can be applied to other apparatus utilising tape. In the embodiment described, the tape 1 has sprocket feed holes and is fed by rotation of a sprocket wheel 2 through a punch block 3. The tape is perforated by a series of punches such as 4 associated with the punch block 3. Each punching and feeding cycle is performed, in a manner not shown, by rotation of a shaft 5 which is driven by a motor and clutch also not shown.

Cams 6 and 7 are fixed to and rotate with the shaft 5. A frame 8 in the form of a bellcrank is pivotally mounted on a shaft 9 and has an arm 10 which engages with the cam 6. The end of one arm of another bellcrank 11 engages with the cam 7, the bellcrank 11 being pivotally mounted on a shaft 12. A clamp member in the form of a rod 13 is pivotally mounted on the other arm of the bellcrank 11 about an axis shown dotted at 14 and passes through a hole in a plate 15 secured to the frame 8. It is preferable to have the shaft 9 and the axis 14 in substantial alignment. The rod 13 has a stop 16 secured thereto and a helical spring 17 is disposed about the rod 13 between the stop 16 and the plate 15 so as to urge the rod 13 towards the tape 1 for clamping the tape between the rod 13 and a flange 18 forming another clamp member. The latter extends from one end of and forms a part of the frame 8.

Two contact springs 19 and 20, insulated from one another by an insulation 21, have their respective contacts 22 and 23 normally touching. An extension 24 on the frame 8 acts on the contact spring 19 so as to open these contacts when the frame 8 is rotated anticlockwise with respect to FIG. 2 about the shaft 9.

The apparatus is shown in the original or rest position in FIGS. 1 and 2 in which position the tape 1 is clamped between the flange 18 and the rod 13. After the tape 1 has been advanced one step by the sprocket wheel 2 the latter is stopped but the shaft 5 continues to rotate until it has completed its cycle of operation. The movement of the tape rotates the frame 8 and the bell crank 11 anticlockwise and this causes contacts 22 and 23 to be opened. The bellcrank 11 moves about its pivot 12 because the spring 17 is holding the rod 13 against the tape 1 and the rod 13 is pivotally attached to the member 11. Immediately after the tape has stopped, rotation of the cam 7 rotates the bellcrank 11 further anticlockwise to draw the rod 13 away from the flange 18 to release the clamping of the tape. During this period the arm 10 of frame 8 is clear of the cam 6, but now both cams engage their respective arms 10 and 11 and move the members 8 and 11 clockwise, keeping them, however, in rotationally spaced relation so that the rod 13 is held away from the tape, thus permitting the clamping means to move back over the now stationary tape. When the frame 8 has reached its normal position, the cam 7 permits the member 11 to be rotated further in a clockwise direction under the action of the spring 17 until the rod 13 clamps the tape again against the flange 18. Rotation of the frame 8 clockwise back to its original position also permits the contacts 22, 23 to close. A stop 25 is provided to prevent excessive clockwise rotation of the frame 8.

A cam 26 (FIG. 3) is also secured to the shaft 5 and is arranged to close contacts 27, 28 momentarily by a cam follower 29 at the time when the contacts 22, 23 are normally open due to anticlockwise rotation of the frame 8 by movement of the tape.

Sprocket wheel 2 and cams 6, 7 and 26 are mechanically interconnected by means of the mechanism 2', such that when sprocket wheel 2 advances, tape 1, cams 6 and 7 are so positioned that the respective bellcranks 8 and 11, which are clamped to tape 1, are free to rotate counterclockwise under the force exerted by tape 1. Rotation of these bellcranks, as a result of tape movement, cause contacts 22 and 23 to open during the same time interval that contacts 27 and 28 are closed by cam 26. Thus, if the tape is being properly fed, contact set 22—23 is open when contact set 27—28 closes. Similarly, if a tape feed failure occurs, bellcranks 8 and 11 remain stationary and contacts 22 and 23 are not opened. Thus, contact sets 22—23 and 27—28 are closed during the same time interval whenever a tape failure occurs.

A relay 39 and a battery 30 (FIG. 4) are connected in series with the contacts 22, 23 and the contacts 27, 28. In the event of failure of the tape to feed, the frame 8 will not move and the contacts 22, 23 will remain closed as noted. When the contacts 27, 28 are thereafter momentarily closed, the relay 39 will operate and be locked by a holding circuit including relay contacts 31. Operation of the relay 39 will prevent further operation of the perforator and/or will cause a warning to be given that the machine has failed.

What we claim is:

1. Tape feed apparatus comprising means for advancing a tape in a step-by-step manner, clamping means normally engaging said tape for movement therewith from an original position to an advanced position, control means for disengaging said clamping means from said advanced tape, for returning said clamping means to said original position, and for controlling said clamping means to reengage the tape, and means controlled by the failure of the tape to advance and move the said clamping means to said advanced position for indicating said failure.

2. Tape feed apparatus, according to claim 1 wherein the said control means includes two separately controlled pivotable members and wherein movement of one member relative to the other causes the said disengagement of the clamping means from the advanced tape.

3. Tape feed apparatus, according to claim 2, wherein the control means further comprises means for pivotally mounting one of the pivotable members on an axis parallel to the tape but perpendicular to the direction of movement of said tape, means for pivotally mounting the other of said members on an axis parallel to the axis of said one member but spaced therefrom in a direction opposite to the direction of movement of said tape, and wherein the clamping means comprises a flange attached to said one member and adapted to engage one side of said tape, a movable element having one end pivotally attached to said other member at a point spaced in the direction of movement of said tape, the other end being positioned adjacent the other side of said tape in alignment with said flange, means on said one member for guiding said movable element, and spring means for normally urging said movable element towards said tape, whereby said tape is clamped between said flange and the other end of said element.

4. Tape feed apparatus, according to claim 3, in which the control means further comprises cam means for causing the other of said pivotable members to pivot with respect to the one of said members in a direction to move the movable element away from the flange and thus release the tape, cam means for causing said one member to return to its normal position after being pivoted about its mounting means by the movement of said tape, and means for operating both said cam means in a predetermined manner with respect to the tape advancing means, whereby the clamping means moves with the tape as the tape takes one step, thus causing movement of the pivotable members about their mounting means, the clamping means is then released from the tape, the first member is then returned to its normal position, and the second member is then returned to its normal position, thus causing the movable element and the flange to clamp said tape between them again.

5. Apparatus, according to claim 4, wherein the means for indicating comprises a circuit, means operated by the tape advancing means for preparing said circuit for operation, and means operated by the one pivotally movable member when it is moved by the tape for rendering said circuit inoperative.

6. Apparatus, according to claim 1, wherein the means for indicating comprises a circuit, means operated by the tape advancing means for preparing said circuit for operation, and means operated by the movement of the clamping means as it moves with the tape for rendering said circuit inoperative.

References Cited in the file of this patent

UNITED STATES PATENTS

| | | |
|---|---|---|
| 2,884,299 | Sandrock | Apr. 28, 1959 |
| 2,911,634 | Ferguson | Nov. 3, 1959 |
| 2,914,265 | Vanderwal | Nov. 24, 1959 |